United States Patent [19]

Williams

[11] Patent Number: 4,923,215

[45] Date of Patent: May 8, 1990

[54] ATTACHMENT STRUCTURE FOR MUD FLAPS

[75] Inventor: Terry D. Williams, Rte. 2, Box 219, Snyder, Tex. 79549

[73] Assignees: F. R. Williams; Ruben C. Martinez; Terry D. Williams, all of Snyder, Tex.

[21] Appl. No.: 256,774

[22] Filed: Oct. 11, 1988

[51] Int. Cl.$^5$ .............................................. B62B 9/16
[52] U.S. Cl. .................................................. 280/851
[58] Field of Search .................. 280/154.5 R; 24/561, 24/562

[56] References Cited

U.S. PATENT DOCUMENTS

| | | | |
|---|---|---|---|
| 3,137,027 | 6/1964 | Birkle | 24/562 |
| 3,285,624 | 11/1966 | Aber et al. | 280/154.5 R |
| 3,333,868 | 8/1967 | Sogoian | 280/154.5 R |
| 3,462,809 | 8/1969 | Froehlich, Jr. | 24/562 |
| 3,650,543 | 3/1972 | Evans | 280/154.5 R |
| 3,684,312 | 8/1972 | Evans | 280/154.5 R |
| 3,778,086 | 12/1973 | Moore et al. | 280/154.5 R |
| 3,923,213 | 12/1975 | George et al. | 24/562 |
| 4,392,690 | 7/1983 | Anderson | 297/DIG. 4 |

*Primary Examiner*—Charles A. Marmor
*Assistant Examiner*—Eric Culbreth
*Attorney, Agent, or Firm*—Wendell Coffee

[57] ABSTRACT

Attachment structure for attaching rubber mud flaps to the frame of a truck includes a back plate. The back plate is bolted to the frame of the truck. A face plate is clamped to a back plate by a tongue and slot on one end and a bolt through a post attached to the back plate and extending through the face plate on the other end. The rubber mud flap is clamped securely in place by non-aligned lugs on the back plate and face plate. A cam wrench is provided to press the face plate down at the post end.

6 Claims, 2 Drawing Sheets

ATTACHMENT STRUCTURE FOR MUD FLAPS

BACKGROUND OF THE INVENTION:

(1) Field of the Invention

This invention relates to mud flaps for trucks, and more particularly to attachment structure for attaching the mud flaps to the frame of a truck.

(2) Description of the Related Art

As used herein the term "truck" means not only those wheeled vehicles which are self contained and carry the cargo thereon, but also those vehicles known as a tractor-trailer rig. This invention relates to attaching mud flaps over the wheels of such rigs, and it is immaterial as to whether the wheels are on the truck, tractor, or trailer. Therefore, for convenience, the term "truck" is meant to be generic to include all vehicles including the three innumerated above which have wheels which have mud flaps thereon.

Mud flaps are necessary equipment for trucks. Indeed, they are often considered such a necessary piece of equipment that the truck is not permitted to proceed along a highway without them. I.e., a truck with a lost, damaged, or ineffective mud flap must be repaired before the truck can continue its journey.

At present time, mud flaps are normally bolted onto back plates which are attached to the frame of the truck. I.e., the top of the mud flap has holes drilled or punched in the top of it which mate with bolts projecting from back plates. Washers and nuts are then placed on the bolts to hold the mud flaps to the back plate. The mud flap operates in a contaminated environment. Not only might mud be upon the bolts, but also in many cases, the bolt might be corroded from use of salt upon the highway to melt ice. In any event, it is often difficult to remove the nuts to replace the mud flaps, and also, it is difficult to replace the nuts upon the damaged bolts. Furthermore, the mud flaps are often not drilled having standard spaced holes in the top, and the bolts on the back plate are not necessarily spaced for the holes. This, in effect, requires the trucker to carry mud flaps which have been punched to mate the bolts upon his back plate, or in any event, to carry mud flaps with holes punched or drilled therein which are also are the proper length. Even so, he has a difficult and time consuming task of replacing the new mud flap for the damaged one.

SUMMARY OF THE INVENTION:

(1) Progressive Contribution to the Art

This invention solves the problem by clamping the mud flap in place. Therefore, the trucker, rather than carrying individually prepunched, cut to length mud flaps, may carry a strip or role of mud flap material. Then all that is necessary is for him to cut off the desired length with a knife. Most truck drivers will have a knife in their tool chest that they would carry on the truck at all times. The mud flap would then be clamped in place between a face plate and back plate. The clamp includes a simple cam type wrench so that it was not necessary to thread a nut on a bolt.

(2) Objects of this Invention

An object of this invention is to attach mud flaps to a truck.

Further objects are to achieve the above with devices that are sturdy, compact, durable, lightweight, simple, safe, efficient, versatile, ecologically compatible, energy conserving, and reliable, yet inexpensive and easy to manufacture, attach, and maintain.

The specific nature of the invention, as well as other objects, uses, and advantages thereof, will clearly appear from the following description and from the accompanying drawing, the different views of which are not scale drawings.

Figure 1:
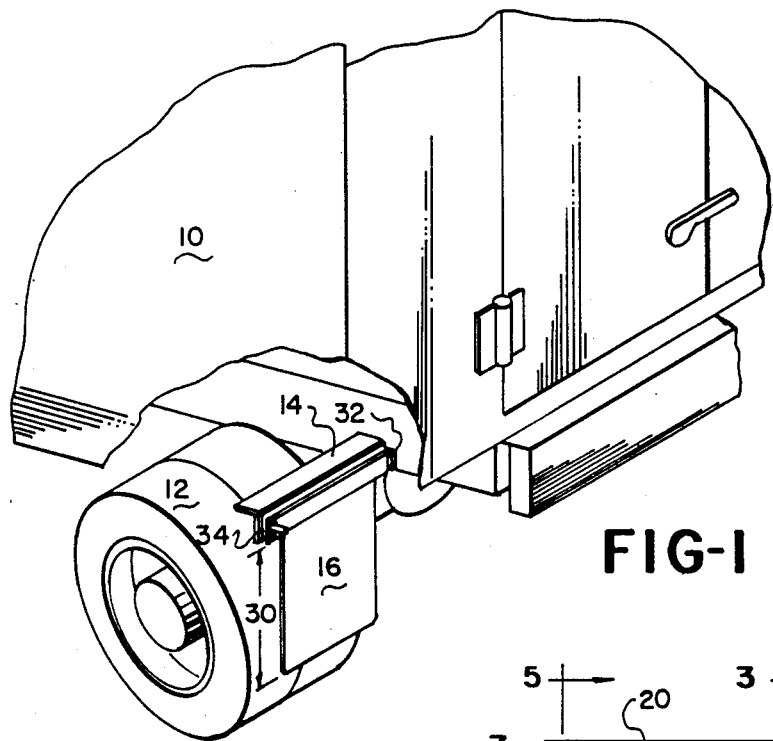
FIG. 1 is a perspective view of a truck with mud flaps attached according to this invention.
Figure 2:
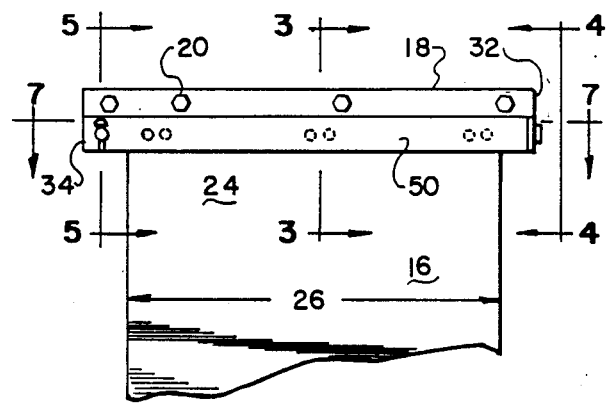
FIG. 2 is a rear elevational view of a portion of the mud flaps and the attachment structure.
Figure 3:
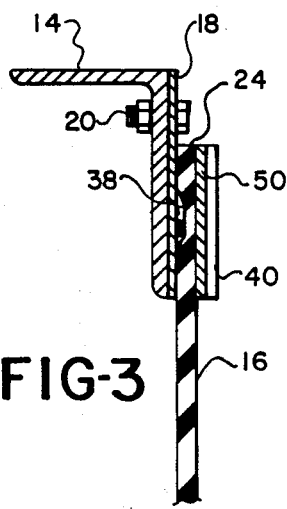
FIG. 3 is a cross sectional view taken substantially on line 3—3 of FIG. 2.
Figure 4:
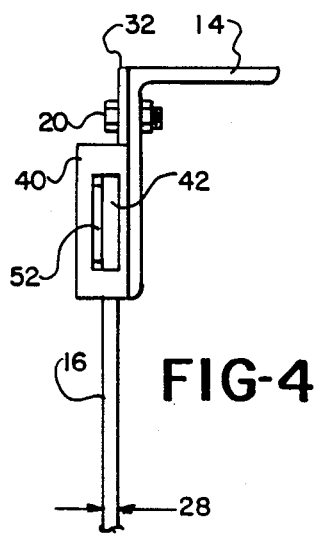
FIG. 4 is an end elevational view taken substantially on line 4—4 of FIG. 2.
Figure 5:
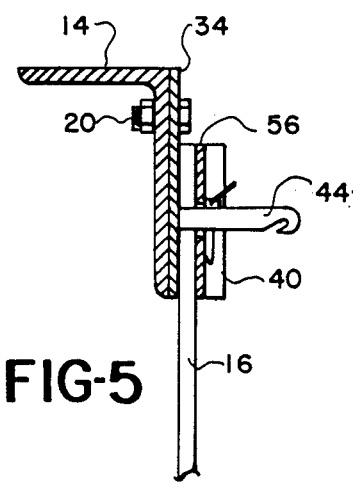
FIG. 5 is a cross sectional view taken substantially on line 5—5 of FIG. 2.

As an aid to correlating the terms of the claims to the exemplary drawing, the following catalog of elements and steps is provided:

10 truck
12 wheels
14 frame
16 mud flaps
18 back plate
20 bolts
22 bolt holes
24 top
26 width
28 thickness
30 length
32 inboard end
34 outboard end
36 end lugs
38 center lug
40 flange
42 slot
44 post
46 post hole
48 notch
50 face plate
52 tongue
54 inboard end
56 outboard end
58 face hole
60 bolt
62 end lugs
64 center lug
66 cam wrench
68 handle
70 cam plates
72 pin

DESCRIPTION OF THE PREFERRED EMBODIMENT:

Truck 10 is represented in FIG. 1 of the drawings. It will be remembered that "truck" is used as a generic term for tractors and trailers, as well as trucks. The truck has wheels 12 attached by suitable structure to frame 14. Rubber mud flaps 16 are attached to the frame 14 behind the wheels. Trucks, wheels, frame, and mud flaps are all well known to the art.

In order to attach the mud flaps to the frame according to this invention, back plate 18 is attached as by four bolts 20 to the frame. The bolts will extend through bolt holes 22 in the back plate 18.

The mud flaps 16 are called "rubber"; however, it will be understood by those skilled in the art that they probably are synthetic material with reenforcing fabric. Also, the mud flaps would have a top 24, width 26, thickness 28, and length 30.

The back plate will have inboard end 32 and outboard end 34 The distance from the inboard end 32 to the outboard end 34 is greater than the width 26 of the mud flap. The back plate will have three lugs which are identified as two end lugs 36 and one center lug 38. Typically, the two end lugs will project 1/8" from the face of the back plate 18 while the center lug will project 3/16" from the face of the back plate 18, for reasons which will be described later.

Flange 40 is formed on the inboard end and extends from the back plate. As a simple expedient of manufacture, the flange 40 may be an extension of the back plate which is bent to right angles to the remainder of the back plate. The flange 40 has slot 42 in the flange. The outboard end of the back plate 18 has post 44 which extends from the back plate. The post has a diametric hole 46 extending therethrough. Also, at the distal end of the post 44 there is notch 48.

Face plate 50 has tongue 52 on inboard end 54. The tongue 52 is in the slot 42 of the flange 40 of the back plate 18. Outboard end 56 of the face plate 50 has hole 58 which fits over the post 44 of the back plate 18. Bolt 60 extends through the hole 46 of the post.

The top 24 of the mud flap 16 extends between the back plate and face plate. It is clamped securely between the back plate 16 and the face plate 50 as will be explained later, and the bolt 60 in the post 44 form a clamp means for clamping the face plate 50 to the back plate 18. Also, the tongue 52 in the slot 42 of the flange 40 forms a portion of the clamp means. Therefore, there is provided a clamp means for clamping the face plate to the back plate mounted between the inboard ends of the face plate and back plate. Also, the clamps means exists between the outboard ends of the face plate and the back plate.

Figure 7:
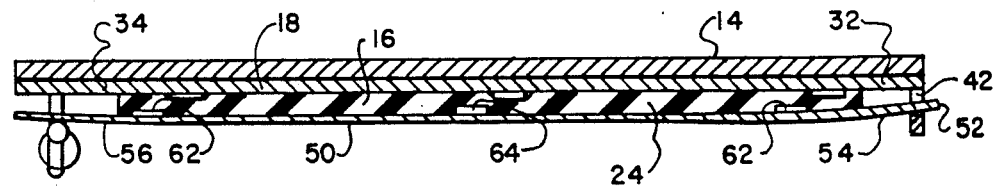
FIG. 7 is a longitudinal sectional view showing the cam wrench in operation taken substantially on line 7—7 of FIG. 2.
Figure 9:
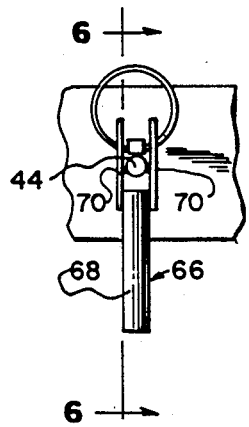
FIG. 9 is a detail showing the cam wrench in use.
Figure 6:
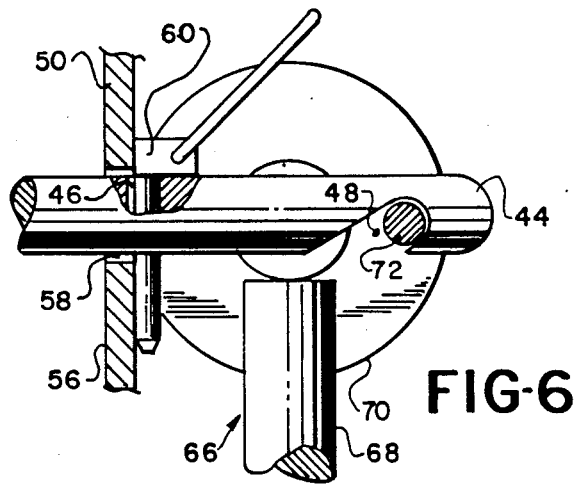
FIG. 6 is similar to FIG. 5; however, showing the cam wrench in the process of clamping the face plate to the back plate, taken substantially on line 6—6 of FIG. 9.
Figure 8:
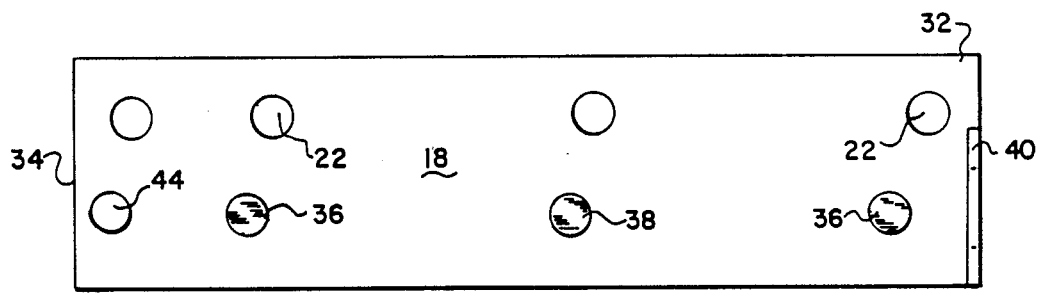
FIG. 8 is a rear elevational view of the back plate.
Figure 10:
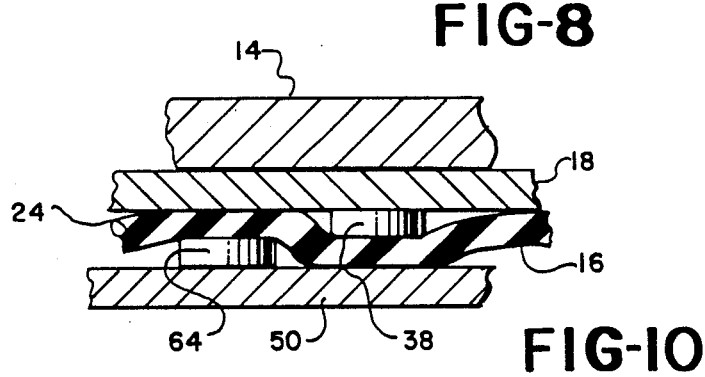
FIG. 10 is a detail of FIG. 7.

The face plate 50 has three lugs. The two ends lugs are identified as end lugs 62 and the center lug on the face plate is identified as center lug 64. The lugs 62 and 64 are nonaligned with the lugs 36 and 38 upon the back plate. Therefore, when the plates are clamped together with the mud flaps therebetween, the mud flaps are held securely by the nonaligned lugs. This arrangement is clearly shown in FIG. 7 of the drawing. The center lug 64 extends from the face plate half again as much as the end lug 62, as was described for the lugs 36 and 38. The reason for this is that the pressure of the lugs against the rubber mud flap will cause the face plate and back plate to bow slightly; and therefore, to have good clamping action between all the lugs and the rubber mud flap, it is necessary to have the center lugs project away from their plates a greater distance than the end lugs.

To hold the mud flaps securely in place, it is necessary that the face plate and back plate be clamped tightly together. To clamp them tightly together, the tongue can be placed in the slot and the face plate pivoted about the slot in the flange 40. However, a great amount of force is needed to force the face plate to the back plate to insert the bolt 60 into the hole 46 in the post 44. While this might be done by clamping pliers commonly called Vise Grips, a better means is provided by cam wrench 66. The cam wrench has handle 68 and two cam plates 70. The cam plates are readily made from metal disks. Washers are suitable for this purpose. The cam plates are attached on each side of the handle 68 so that they are parallel and coaxial. The attachment is readily made by welding. Pin 72 extends from one cam plate to the other eccentrically, as seen in the drawings.

Therefore, the pin 72 can be placed in the notch 48 and the cam plates 70 rotated by the handle 68 to force the face plate 50 against the rubber mud flap 16. When the cam plates are at dead center or past dead center, the design of the location of the notch 48 and the hole 46, as well as the location of the pin 72 in the cam plates 70, are such that bolt 60 will readily fit through the hole 46.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claims as my invention:
1. On a truck having:
   a. wheels journaled to
   b. a frame, and
   c. rubber mud flaps behind the wheels,
   d. said mud flaps having a top, width, thickness, and length,
   e. a improved structure for attaching the flaps to the frame comprising:
   f. a back plate attached to the truck frame having:
      i. an inboard end and an outboard end,
      ii. a distance from the inboard end to the outboard end greater than the width of the mud flap,
      iii. a flange on the inboard end extending from the back plate,
      iv. a slot in the flange,
      v. a post attached near the outboard end and extended from the back plate,
      vi. a notch on an end of the post,
      vii. a hole in the post, and
      viii. lugs on the back plate,
   g. a face plate having
      i. an inboard and an outboard end,
      ii. a tongue on the inboard end in the slot of the flange of the back plate,
      iii. a hole at the outboard end over the post of the back plate so that a bolt through the hole in the post will hold the face plate onto the back plate, iv. lugs on the face plate nonaligned with the back plate lugs,
h. the top of one of said mud flaps securely clamped between the back plate and face plate by the lugs.

2. The invention as defined in claim 1 further comprising:
   j. there being three lugs on the back plate, each of the back plate lugs being in the form of a cylindrical disk
   k. one disk near the outboard end and another disk near the inboard end, and the third disk about the center,
   l. the third disk at the center projecting from the back plate about 1½ times the distance the other two disks project from the back plate.

3. The invention as defined in claim 2 further comprising:
   m. there being three lugs on the face plate, each of the face plate lugs being in the form of a cylindrical disk
   n. one disk near the outboard end and another disk near the inboard end, and the third disk about the center,
   o. the third disk at the center projecting from the face plate about 1½ times the distance the other two disks project from the face plate.

4. The invention as defined in claim 1 further comprising:
   j. a cam wrench having
   k. a handle with a cam end,
   l. two cam plates attached to the handle of the cam end, one of the cam plates on each side of the handle,
   m. a pin extending between the cam plates engaged with the notch in the post, and
   n. said cams engaging the face plate so as to press it against the mud flap so that a bolt may be placed or removed from the hole in the post.

5. The invention as defined in claim 4 further comprising:
   o. there being three lugs on the back plate, each of the back plate lugs being in the form of a cylindrical disk
   p. one disk near the outboard end and another disk near the inboard end, and the third disk about the center,
   q. the third disk at the center projecting from the back plate about 1½ times the distance the other two disks project from the back plate.

6. The invention as defined in claim 5 further comprising:
   r. there being three lugs on the face plate, each of the face plate lugs being in the form of a cylindrical disk
   s. one disk near the outboard end and another disk near the inboard end, and the third disk about the center,
   t. the third disk at the center projecting from the face plate about 1½ times the distance the other two disks project from the face plate.

* * * * *